United States Patent [19]

House

[11] 4,449,760

[45] May 22, 1984

[54] SELF-LEVELING PLATE DISPENSER

[75] Inventor: Bruce F. House, Miami, Fla.

[73] Assignee: Shelley Manufacturing Company Division of Allo Food Service Equipment Company, Miami, Fla.

[21] Appl. No.: 440,852

[22] Filed: Feb. 14, 1983

[51] Int. Cl.$^3$ .............................................. A47F 1/10
[52] U.S. Cl. ..................................... 312/42; 312/71; 312/73; 108/55.3
[58] Field of Search .................... 211/490; 312/42, 61, 312/71, 73; 221/242; 248/27.1, 27.3, 148, 149, 670, DIG. 11, DIG. 12; 108/136, 55.3

[56] References Cited

U.S. PATENT DOCUMENTS

| | | | |
|---|---|---|---|
| 2,816,806 | 12/1957 | Haines | 211/59.3 |
| 3,862,704 | 1/1975 | Millies et al. | 211/242 |
| 3,937,361 | 2/1976 | House | 312/71 |
| 4,181,282 | 1/1980 | Oliver et al. | 248/448 |
| 4,199,068 | 4/1980 | Weitzner | 211/59.2 |
| 4,206,954 | 6/1980 | Kooiman | 211/59.3 |

FOREIGN PATENT DOCUMENTS 1109882 4/1966 United Kingdom .............. 211/59.2

Primary Examiner—Francis K. Zugel
Assistant Examiner—Joseph Falk
Attorney, Agent, or Firm—Ernest H. Schmidt

[57] ABSTRACT

An adjustable, self-leveling dispenser for stacked plates or platters has a pressure head within a plate well or tank and a plurality of tension springs peripherally arranged about the outer periphery of the tank and connected between first arcuate support members movable along the outside of the tank and second arcuate support members fixed with respect to the tank, the first arcuate support members being secured to radial support members projecting through longitudinally-extending slots in the tank for yieldingly supporting the pressure head from underneath. A plurality of guide rod members vertically disposed in spaced relation within the tank and stepwisely adjustable along a range of distances outwardly of the center of the pressure head serve as abutment slide means for guiding peripheral edge portions of any selected size of a wide range of sizes of stacked plates to be dispensed.

6 Claims, 7 Drawing Figures

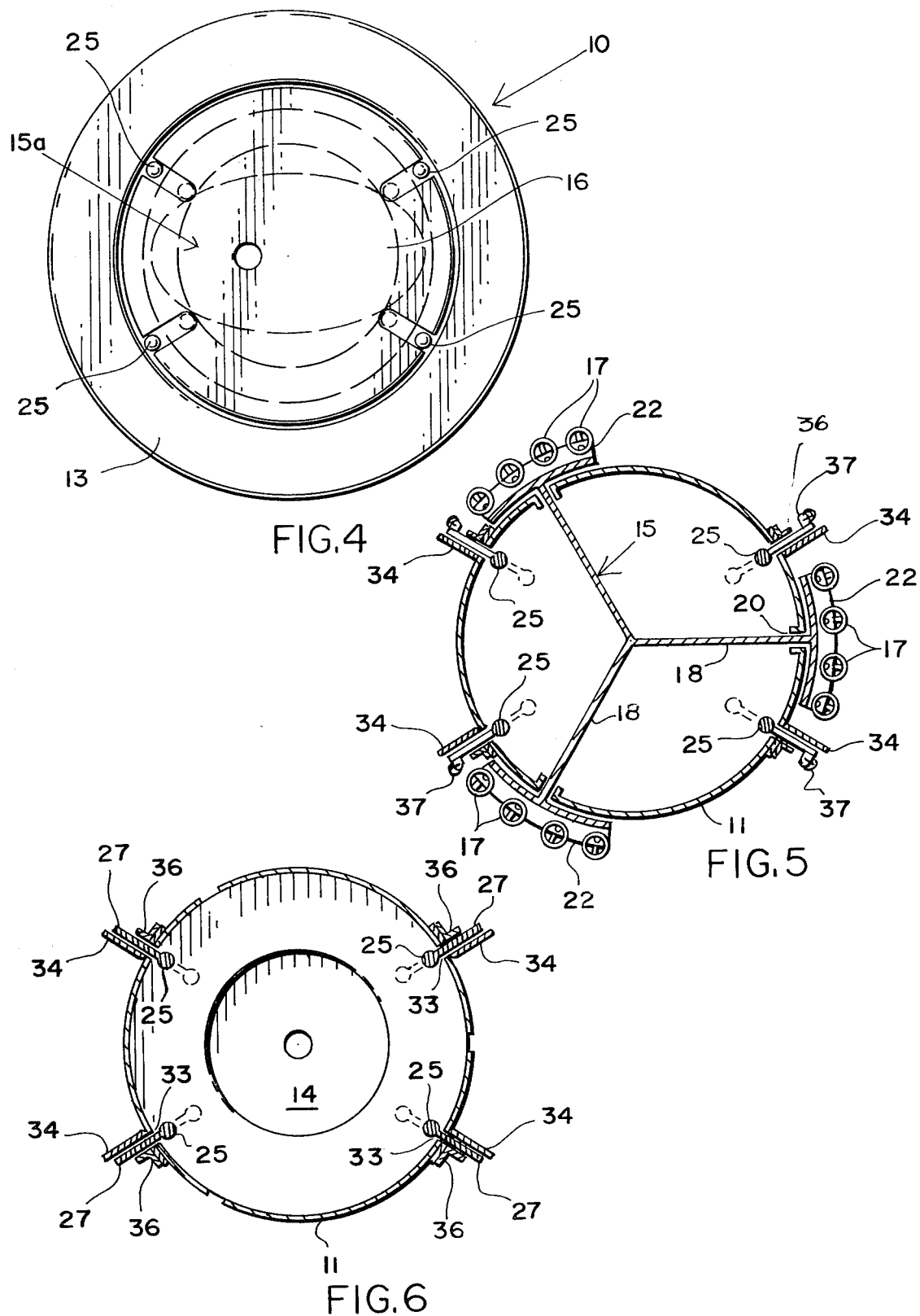

4,449,760

SELF-LEVELING PLATE DISPENSER

BACKGROUND OF THE INVENTION

This invention relates to self-leveling plate of dish dispensers of the type used in cafeterias or restaurants, for example, and is directed particularly to improvements therein, particularly with respect to the guide mechanism for accommodating a range of sizes, selectively, of the dishes to be dispensed.

In my U.S. Pat. No. 3,937,361, issued Feb. 10, 1976, there is illustrated and described an adjustable self-leveling plate dispenser having an internal compression spring constrained between a pressure head upon which the stacked dishes are supported and the bottom of the dispensing tank, and further including a plurality of vertically-extending guide rods adjustable radially of the vertical axis of the dispensing tank to accommodate various sizes of dishes to be dispensed. Because food particles and other foreign matter falls through the upper end of the tank to accumulate at the inside, it is often necessary, for sanitation purposes, to remove the pressure head to clean the tank and the plate guide mechanism.

SUMMARY OF THE INVENTION

It is principal object of the present invention to replace such an internal plate guide mechanism with guide rods the radial adjustment of which is controlled by flat hook and guide members attached in splaced relation therealong and extending outwardly through slots in the tank, thereby minimizing that portion of the plate guide mechanism within the tank and thereby obviating contamination by food particles, dust and the like falling through the top of the tank. The cleaning of the interior of the tank, whenever necessary, is thereby thus facilitated.

Another object of the invention is to simplify the adjustable plate guide mechanism to provide for its easy removal, thereby further simplifying cleaning and sanitizing of the tank.

Other objects, features and advantages of the invention will be apparent from the following description when read with reference to the accompanying drawings. In the drawings, wherein like reference numerals denote corresponding parts throughout the several views:

BRIEF DESCRIPTION OF THE DRAWINGS

In the drawings, wherein like reference numerals denote corresponding parts in each of the several views:

FIG. 4 is a top plan view of the plate dispenser;

FIG. 5 is a horizontal cross-sectional view taken along the line 5—5 of FIG. 3 in the direction of the arrows;

FIG. 6 is a horizontal cross-sectional view taken along the line 6—6 of FIG. 3 in the direction of the arrows.

Figure 2:
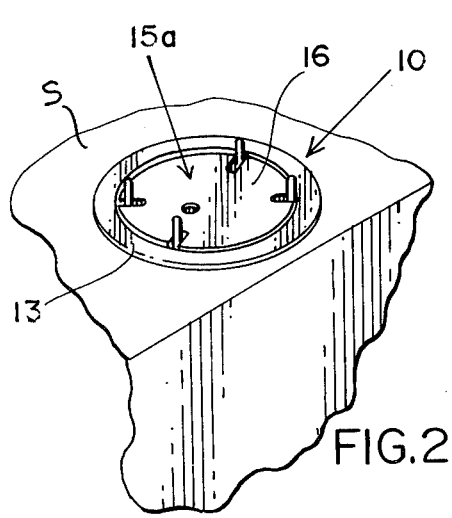
FIG. 2 is a fragmentary oblique view illustrating a serving counter top fitted with a plate dispenser embodying the invention.
Figure 1:
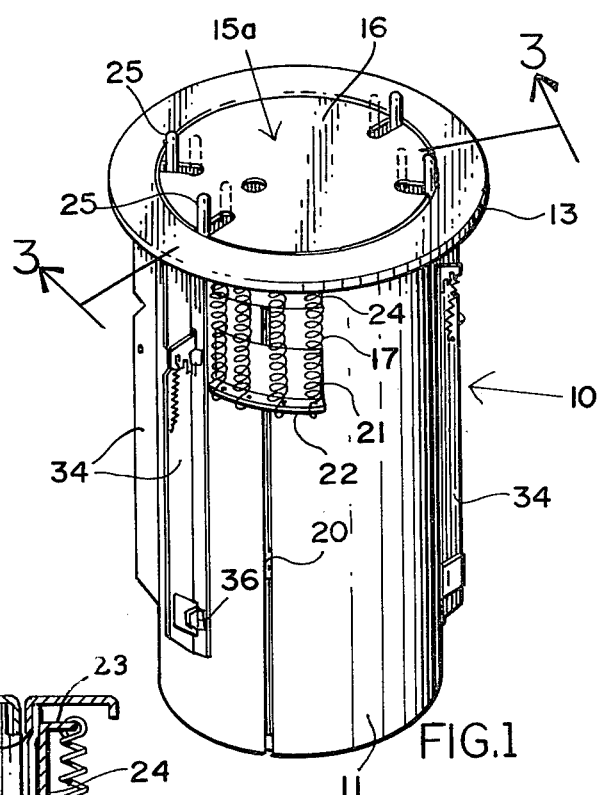
FIG. 1 is an oblique view, as viewed from above, of an adjustable plate dispenser embodying the invention.
Figure 3:
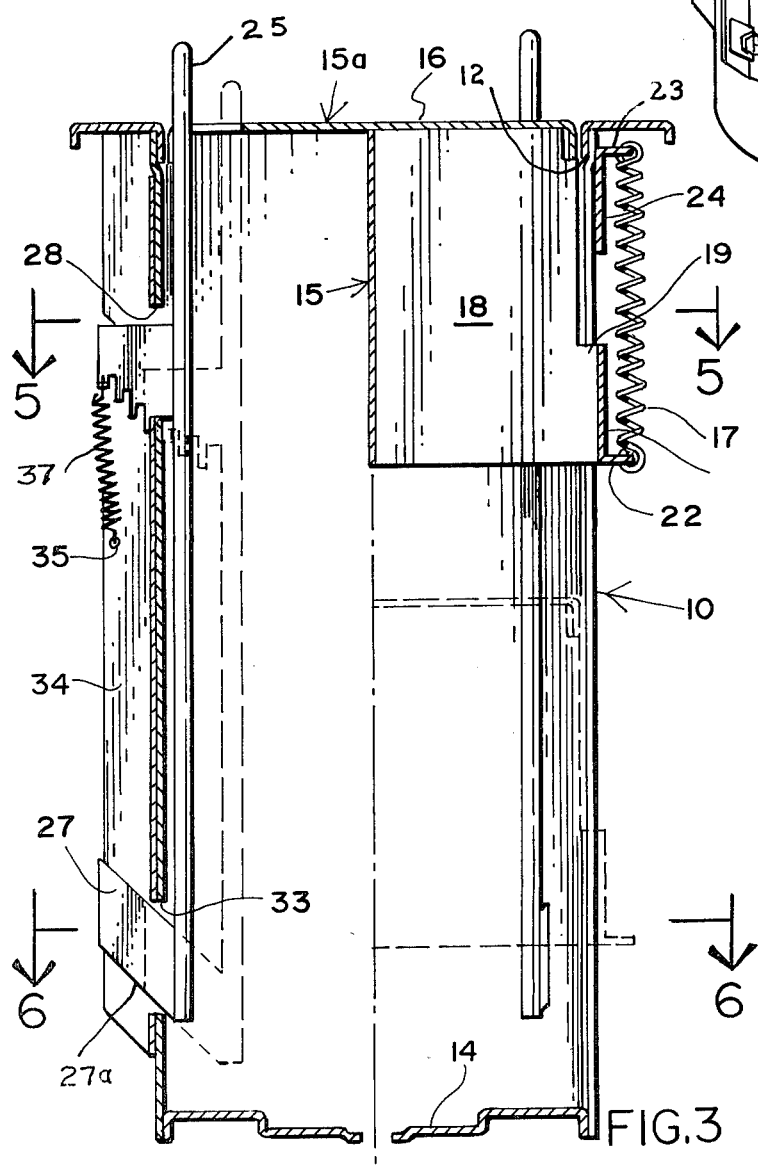
FIG. 3 is a longitudinal cross-sectional view taken along the broken line 3—3 of FIG. 1 in the direction of the arrows.

Referring now in detail to the drawings, reference numeral 10 in FIGS. 1, 2 and 3 designates, generally, an adjustable self-leveling plate dispenser embodying the invention. The self-leveling plate dispenser comprises a cylindrical tank 11 the upper end of which is spot-welded or otherwise secured against the outside of a short, downwardly-extending, inner skirt portion 12 of an annular, upper end flange 13 which, as illustrated in FIG. 2, serves to support the assemblage within a circular opening provided in a serving table or counters, for example (partially illustrated in FIG. 2). The cylindrical tank 10 is fabricated of sheet metal, preferably stainless steel and is enclosed at the lower end, with a peripherally flange bottom plate 14, spot-welded in place.

Vertically slidable within the cylindrical tank 11 is a pressure head assembly 15a comprising, generally, a load carrier 15, a circular plate support base or cover 16, and a plurality of tension springs 17. As is hereinbelow more particularly described, the tension springs 17 serve to support plates stacked on the load carrier cover so that the uppermost plate will be in proper position for ready withdrawal.

Load carrier 15 comprises three flat, sheet-metal members 18 welded together along vertical edges extending radially-outwardly of one another and angularly-spaced equidistantly, that is, separated by 120 circular degrees. As best illustrated in FIGS. 1, 3 and 5, the flat load carrier members 18 are each provided, at their outer lower edge protions, with short, rectangular, outwardly-extending portions 19 which project through one each of three equidistantly spaced slots 20 in the tank 11. An arcuate spring support plate 21 is welded against the outer edge of each of the outwardly-extending portions 19 of the load carrier 15, said spring support plate having an arcuate flange portion 22 extending laterally and outwardly of the lower end thereof. The arcuate flange portion 22 is provided with a plurality of equidistantly-spaced openings along its length for the removable interconnection of lower end hook portions of tension springs 17. The upper ends of the tension springs 17 are removably hooked in vertically aligned openings in the outwardly-extending arcuate flange portions 23 of arcuate upper spring support plates 24 welded against the outside of the tank 11. The springs support plates 24 straddle the upper end of their respective tank slots 20. It will thus be understood that the tension springs 17 being fixed at their upper ends with respect to the tank 11, supply upwardly-directed resilient tension to the load carrier 15 of the pressure head assembly. It is to be understood that the spring rate of the tension springs 17, which is governed by the characteristics of the spring wire, the number of coils per unit length and the diameter of the coils, will be such as to supply a substantially constant force through the flat load carrier members 18 against the underside of the pressure head assembly cover 16. A sufficient number and size of tension springs 17 will be interhookingly engaged between upper spring support plate 24 and lower spring support plate 21 to support any given size of stacked plates so that the uppermost one will be in proper position for ready withdrawal.

An important feature of this invention resides int he mechanism and means by which adjustment can be made for accommodating the plate dispenser to use for dispensing various sizes of plates or platters. To this end, as is best illustrated in FIGS. 1, 3 and 5, there is provided within the cylindrical tank 11, a plurality, three in the embodiment illustrated, or vertically-extending guide rods 25. As best illustrated in FIG. 4, the guide rods 25 are arranged to define a rectangle, the opposed side pairs of which are of different lengths rather than defining a square, for the reason hereinafter more particularly described.

Figure 7:
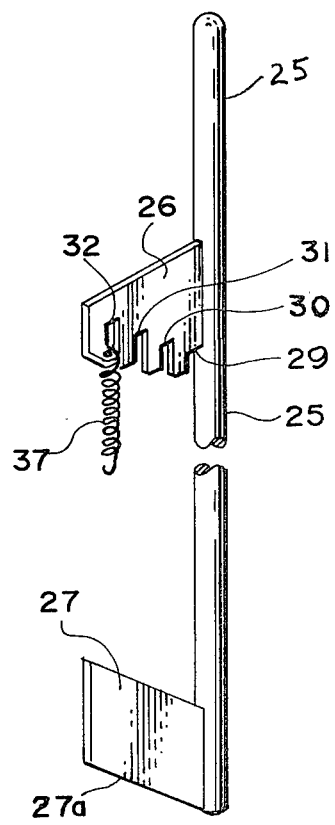
FIG. 7 is an oblique view of one of the plate guide rod assemblies, shown separately.

As illustrated in FIG. 7, each guide rod 25 has secured thereto as by welding, a radially-outwardly-extending hook plate 26 and a bottom abutment plate 27 in the shape of a parallelogram, both of which plates lie in a common plane. Each guide rod hook plate 26 extends through short vertical slot 28 in the tank 11 and is provided along its lower edge with a plurality of vertically-extending cut-outs 29, 30, 31, 32 defining slots of incrementally increasing depth from the inner end to the outer end thereof. The bottom abutment plate 27 of each guide rod extends through a lower vertical slot 33.

A right-angularly bent guide member 34 is spot-welded or otherwise fixed against the outside of the tank 11 adjacent each of the vertical slots 28 and 33, said guide member having slots in register with the tank slots 28 and 33 to provide for through passage of the hook plate 26 and abutment plate 27 of respective guide rods 25. As best illustrated in FIGS. 5 and 6, one side each of the hook plates 26 and abutment plates 27 bares flat against the outwardly projecting portion of its associated guide member 34. The other sides of the guide rod hook plates 26 and abutment plates 27 are constrained against rotary movement by a right-angular guide member 36 welded along the outer end of the flange portion of guide member 34 is spaced relation with respect to the outwardly projecting portion thereof. A tension spring 35, one end of which is secured to an outer end portion of each guide rod hook plates 26 and the other end of which is secured in a vertically-downwardly spaced opening in its associated guide member 34, resiliently constrains each guide rod in the downward direction. As so constrained, the downward limit of each of the guide rods 25 is determined by which of the cut-outs 29, 30, 31 or 32 is placed into engagement with the upper edge of the associated vertical slot 28 in the tank 11. This, in turn, determines the radial distance from the center of the tank of each of the guide rods 25. Thus, as illustrated by the broken-line representation thereof in FIG. 3, if a guide rod is lifted against the downward urging of tension spring 37 and placed so that the slot 29 is in engagement with the lower edge of the vertical tank slot 28, the guide rod will be at its innermost position. If all of the guide rods 25 are thus placed in their innermost positions, the plate dispenser will be adjusted to accommodate and guide for dispensing small diameter plates (see inner broken line circle in FIG. 4, representative of small circular plates). When so positioned, the guide rods will also accommodate small size platters (see broken line representation thereof in FIG. 4). As the guide rods are lifted and repositioned with other of the cut-outs in abutment with the lower edge of their corresponding vertical tank slots 28, the plate dispenser serves to accommodate a variety of plate and platter sizes.

The lower edge of the bottom of abutment plate 27 defines an angle such that, for each of the adjusted positions of the hook plates 26, it will abut the lower edge of its vertical tank slot 33 when the corresponding guide rod 25 is in vertical position. The guide rods 25 therefore, however radially adjusted within the tank for accommodating various sizes of plates and platters, will always guide the stacked plates or platters for vertical movement all along the interior length of the tank.

While I have illustrated and described herein only one form in which my invention can conveniently be embodied in practice, it is to be understood that form is presented by way of example only and not in a limiting sense. The invention, in brief, comprises all the embodiment and modifications coming within the scope and spirit of the following claims.

What I claim as new and desire to secure by Letters Patent is:

1. In a self-leveling plate dispenser of the type having a vertically-extending, open-top tank for receiving stacked plates, dishes or platters to be dispensed and including mechanism resiliently constraining the stacked plates, dishes or platters therein in the upward direction from underneath for dispensing from the top of the tank, the improvement comprising, mechanism for vertically guiding within the tank any one, selectively, of an incrementally increasing range of peripheral sizes of such stacked plates, dishes or platters, said vertically guiding mechanism comprising a plurality of vertically-disposed guide rods circularly spaced within the tank, means for independently stepwisely adjusting each of said guide rods along a range of distances extending radially outwardly of the central longitudinal axis of the tank, said guide rods serving as abutment slide means for guiding peripheral edge portions of any selected one of a range of incrementally increasing sizes and peripheral shapes of stacked plates, dishes or platters placed in the tank for dispensing, said guide rod adjusting means for each of said stepwise adjusting means comprising hook means fixed to and extending radially outwardly of said guide rod and projecting through a slot in the tank, said hook means comprising a hook member having a plurality of vertically-extending recesses of incrementally increasing depth from the inner to the outer end along the bottom thereof, resilient means normally constraining said hook member and its associated guide rod in a downward, longitudinal direction within the tank, the recesses of said hook member being selectively placeable over the lower edge of said tank slot for adjustably positioning said guide rod in a predetermined radially-outward distance with respect to the central longitudinal axis of the tank.

2. The invention as defined in claim 1 wherein said hook member comprises a flat plate extending radially-outwardly of said tank slot, and guide means fixed with respect to the outside of said tank for constraining said plate member and its associated guide rod against rotary movement.

3. The invention as defined in claim 2 wherein said hook member resilient constraining means comprises a tension spring the ends of which are fixed, respectively, with respect to said hook plate member and said tank.

4. The invention as defined in claim 3 including means preventing radial outward movement of the lower end of said guide rod beyond the adjusted radial distance of the upper end of said guide rod in said tank.

5. The invention as defined in claim 4 wherein said radial outward increment preventing means comprises a flat abutment plate extending radially outwardly of the lower end of said guide rod below said hook member plate and lying in a common vertical plane with respect thereto, said abutment plate extending through a second vertical slot below said first mentioned slot and in vertical alignment therewith, the lower edge of said abutment plate defining an angle with respect to the axis of said guide rod which is substantially equal to the angle defined with respect to the axis of said guide rod by said increasing depth of said hook member recesses.

6. The invention as defined in claim 5 wherein said circularly-spaced guide rods are so relatively arcuately disposed when in the same radially-adjusted positions as to define a rectangle.

* * * * *